Dec. 4, 1951 R. T. HILL 2,577,327
ELECTRICALLY HEATED CONTAINER FOR CONDIMENT SHAKERS
Filed Dec. 5, 1950 2 SHEETS—SHEET 1
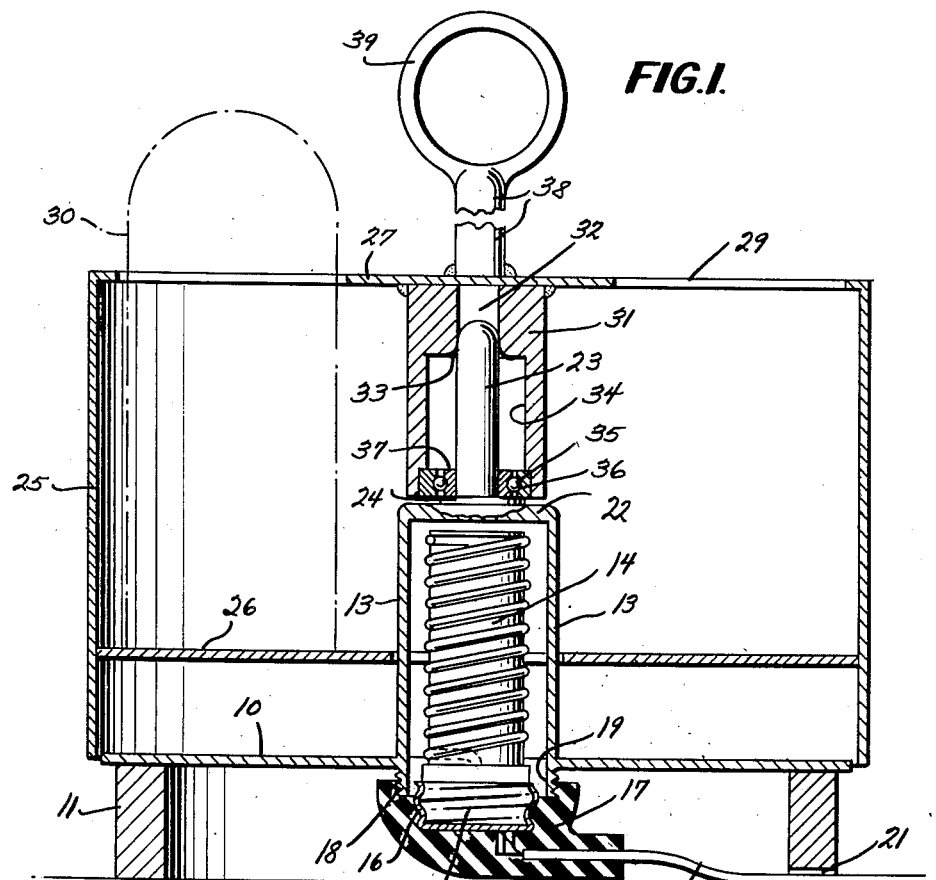
FIG.1.
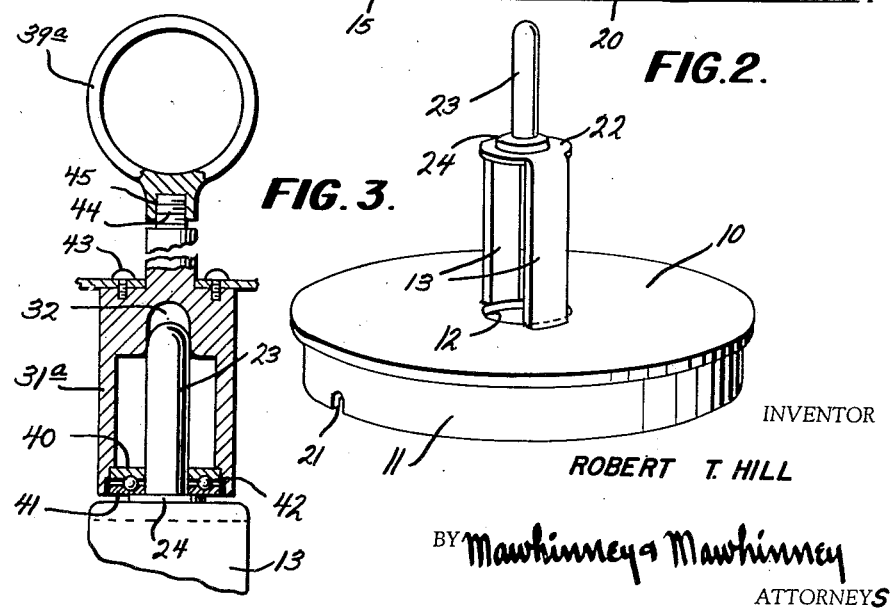
FIG.2.
FIG.3.
INVENTOR
ROBERT T. HILL
BY Mawhinney & Mawhinney
ATTORNEYS Dec. 4, 1951     R. T. HILL     2,577,327
ELECTRICALLY HEATED CONTAINER FOR CONDIMENT SHAKERS
Filed Dec. 5, 1950     2 SHEETS—SHEET 2
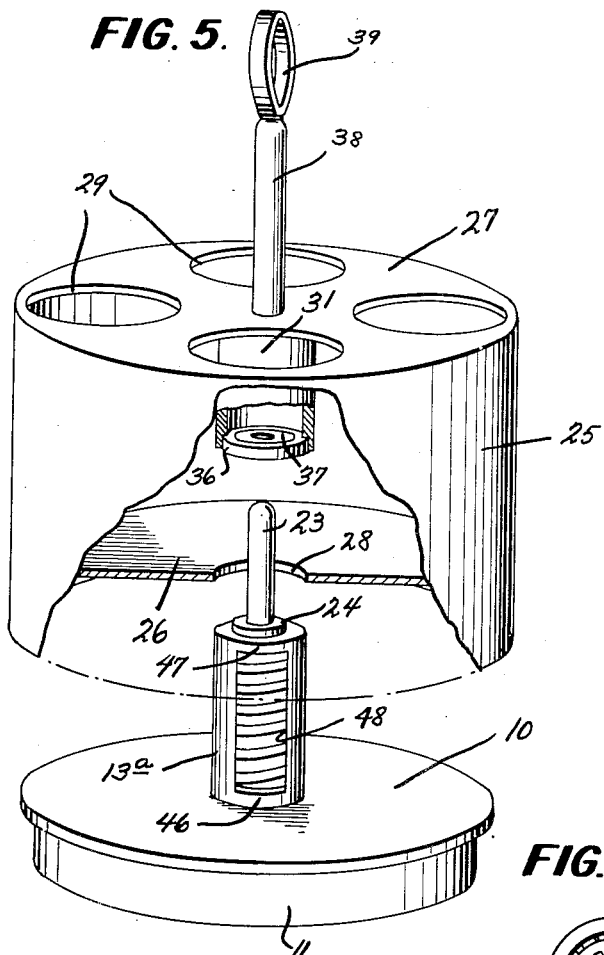
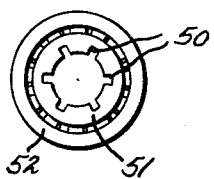
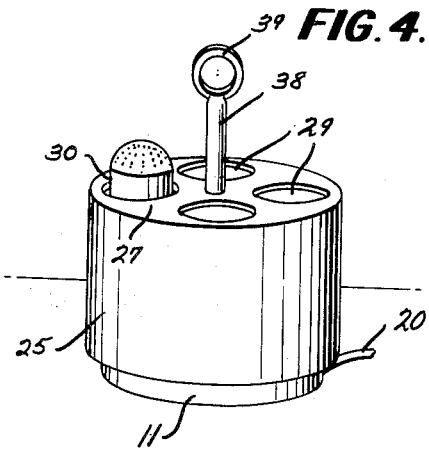
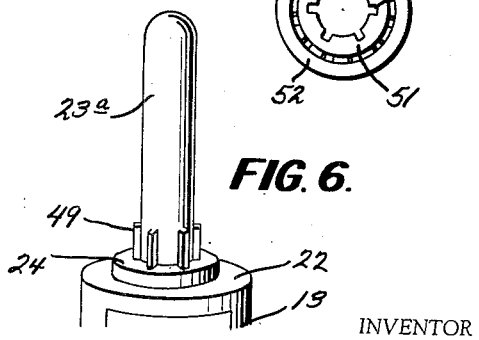
INVENTOR
ROBERT T. HILL
BY Mawhinney & Mawhinney
ATTORNEYS Patented Dec. 4, 1951

2,577,327

UNITED STATES PATENT OFFICE 2,577,327

ELECTRICALLY HEATED CONTAINER FOR CONDIMENT SHAKERS

Robert Towner Hill, Coral Gables, Fla.

Application December 5, 1950, Serial No. 199,173

8 Claims. (Cl. 219—19)

The present invention relates to improvements in electrically heated container for condiment shakers and has for an object to provide a device to act as a condiment warmer for the purpose of drying salt shakers and the like to keep them dehumidified at all times.

Another object of the invention is to provide a device for warming salt and pepper shakers, containers for sugar, spices, various seasonings and the like to maintain the contents of such receptacles in a dry condition and against agglomerating whereby the contents may be easily dusted or shaken out through the perforated tops usual in such receptacles.

A further object of the invention is to provide an improved condiment holder and warmer in which the condiment receptacles are supported by a rotatable carrier which admits of being rotated to bring any particular condiment receptacle to the hand of the operator or diner.

A still further object of the invention is to provide an electrically heated container for condiment shakers in which a base member including the heater and a carrier member removably supports the shakers with an arrangement between the base member and carrier to permit the carrier to rotate about the base member and also to be lifted off the base member together with the shakers so that the same may be brought to the table while the base member remains in the kitchen or at some remote location.

With the foregoing and other objects in view, the invention will be more fully described hereinafter, and will be more particularly pointed out in the claims appended hereto.

In the drawings, wherein the symbols refer to like or corresponding parts throughout the several views, Figure 1 is a vertical sectional view taken through an electrically heated container for condiment shakers as constructed in accordance with the present invention.

Figure 2 is a perspective view of a form of base member employed.

Figure 3 is a fragmentary vertical sectional view showing a modified form of bearing.

Figure 4 is a perspective view, on a reduced scale, of the device in complete assembled form ready for use.

Figure 5 is an exploded perspective view with parts broken away and parts shown in section indicating the method of assembly.

Figure 6 is a fragmentary perspective view of a still further modified form of spindle; and Figure 7 is a plan view of a modified form of bearing cooperating with the spindle of Figure 6.

Referring more particularly to the drawings 10 designates a platform or base adapted to be supported at an appropriate elevation from the table or other support by a circular or other leg or legs 11.

The platform 10 has a substantially central opening 12 therethrough straddled by the legs 13 of an inverted U-shaped support, which legs are carried by or affixed to the platform 10 in any suitable manner so as to derive support therefrom. These legs 13 also constitute a housing, open at the sides, for accommodating an electric resistance heating coil 14 having a threaded base 15 to screw into and out of the threaded socket 16 imbedded or otherwise mounted in a preformed plastic or other socket block 17 which may be removably secured as by the threads 18 to an externally threaded hollow stud 19 projecting downwardly from the platform 10 about the opening 12 and supported by such platform 10. The lead-in wires to the block 17 and socket 16 are indicated at 20, the same being accommodated in the hollow space circumscribed by the leg 11, and such leg is preferably provided with a notch 21 through which such wires 20 may be passed without interfering with the flat placement of the leg 11 upon the table surface throughout its circumferential area in order to avoid tilting of the device.

Carried upon the legs 13 is a disc or plate 22 for supporting an upstanding spindle 23 having a base step 24.

All of the foregoing parts constitute the base of the device and are fixed and stationary parts.

A rotary carrier is adapted to be detachably mounted upon such base member and it comprises generally an external side wall 25, preferably cylindrical with its axis vertical, a bottom 26 and a top wall 27. The bottom wall 26 is carried within the side wall 25 at a substantial elevation above the lower end of such side wall 25 which is left open to be received circumferentially about the circular edge of the base platform 10. The bottom member 26 is formed with a substantially central opening 28 of a diameter to be received over the support 13.

In the top wall 27 are openings 29 eccentric to the axis of the cylinder 25. These openings 29 may be in any suitable number and of any required diameter to conform to salt and pepper cellars or shakers or bottles or jars for containing condiments, spices and the like. One of such receptacles is indicated at 30 in broken lines in Figure 1, all such receptacles being removably mounted through the openings 29 and adapted to rest on their bases upon the bottom wall 26.

Dependent from the central portion of the top wall 27 is a bearing block 31 having an upper bearing socket 32 to receive the upper rounded end of the spindle 23 which may be conveniently guided into the bearing socket 32 by the engagement of its upper rounded end with complementally rounded or beveled edges 33 of the lower entrance mouth of such bearing socket 32. Below the mouth 33 the bearing block 31 is internally relieved forming a recess 34, the wall of which is spaced from the external wall of the spindle 23 throughout the major intermediate portion of the length of the spindle 23 in order to avoid undue friction between the spindle and its bearing block 31. At the lower end of the bearing block 31 a ball or other bearing 35 is provided having the external race 36 affixed to the bearing block 31 and an internal race 37 which frictionally receives the spindle 23 and consequently is stationary with the spindle. Thus the spindle is supported by bearings at its upper and lower ends but its intermediate portion is left free of contact of the bearing block 31.

A shank 38 is affixed to the upper central part of the top wall 27 and terminates in a ring or other handle 39 adapted to the reception of a finger whereby the rotary carrier may be lifted off the base or rotated about the base.

Referring more particularly to Figure 3 a modified form of ball bearing is illustrated in which upper and lower races 40 and 41 receive the balls 42 therebetween with the upper race ring 40 affixed to the bearing block 31ª while the lower race ring 41 is free of the bearing block 31ª but rests with the superposed weight of the carrier upon the step 24. Thus the lower ring 41 tends to remain stationary with the base while the upper race ring 40 tends to rotate with the carrier. In the same way in Figure 1 the inner race 37 rests upon the step 24 and tends to remain stationary with the base and with the spindle 23 while the outer race ring 36 is fixed to rotate with the bearing block 31 and thus rotates whenever the carrier is rotated.

In Figure 3 are also illustrated screws or other fastenings 43 by which the bearing block 31 may be removably affixed to the top wall 27. This Figure 3 also illustrates an upstanding externally threaded stud 44 on the upper end of the shank 38 for removably and detachably receiving the internally threaded socket 45 of the handle 39ª.

In Figure 5 the legs 13 are replaced by a cylindrical form of support 13ª which has connecting lower and upper portions 46 and 47 and lateral cut-outs 48 for exposing the receptacles 30 to the heating element 14.

In Figures 6 and 7 a further modified form of the device is shown in which splines or keys 49 project from the lower portion of the spindle 23ª to form a driving fit with the key-ways 50 on the inner race ring 51 in order to hold such inner race ring 51 stationary with the spindle and base. The outer race ring 52 is as shown in Figures 1 and 5 affixed to the bearing block 31 and rotates therewith.

In the use of the device, the rotary carrier is assembled to the base by lowering such carrier from a position poised above the base as shown in Figure 5 with the two members axially aligned. So that as the rotary carrier is lowered the spindle 23 will be entered through the ball bearing and eventually into the upper bearing socket 32. The carrier is supported by the ball bearing upon the step 24. The friction of relative rotation is reduced to a minimum through the ball bearing and through the small area of contact which the tip of the spindle 23 has with the internal wall of the upper bearing socket 32. This bearing area is just sufficient to give to the bearing block 31 a two-point bearing support upon the spindle 23 at rather widely separated points at opposite end portions of the spindle which will be effective to stabilize the carrier against incidental tipping movements angular to the vertical apex about which the carrier rotates. The overlap of the lower portion of the side cylindrical wall 25 of the carrier peripherally of the platform 10 will also orient the carrier and tend to prevent any sagging of the carrier at any angular point about the vertical axis.

The lead-in wires may be plugged into any outlet receptacle for furnishing the necessary electric current to the resistance unit 14 which will become heated with the passage of current therethrough. The shakers or other receptacles 30 reposing in the carrier will be subject to the heat radiating from the element 14 so that moisture will be driven from the contents of these receptacles thus preserving such contents in a dry condition most suitable for passing through the small openings of the perforated tops of such receptacles.

The device may be placed upon a dining room or other table or support. By rotating the carrier a desired receptacle 30 may be brought opposite any particular diner thus enabling with facility the selection of the condiment desired at any particular time.

Alternately the base may be retained in the kitchen or pantry with the carrier thereon for such length of time as necessary to dry the contents of the containers 30 whereupon the carrier may be lifted off the base as indicated in Figure 5 and transported to the dining table where such carrier may be placed directly upon the table with the lower edge of the side wall 25 resting upon the table. Such carrier may be passed from one place to another at the dining table. At the conclusion of the dinner the carrier may be restored to the base in the assembled position as shown in Figures 1 and 4 and the current may be kept on through the heating unit 14 or such current may be disconnected until the use of the device as a drying unit again becomes necessary.

The heating element 14 may be what is known as a long-lived heater with three to four watts output.

By inverting the base and unscrewing the block 17 from the hollow stud 19 the heating element 14 is withdrawn with the socket block 17 and thereafter the heating unit 14 may be unscrewed from the socket 16 and a new heating unit screwed into place when needed.

Although I have disclosed herein the best form of the invention known to me at this time, I reserve the right to all such modifications and changes as may come within the scope of the following claims.

What I claim is:

1. An electrically heated container for condiment shakers comprising a base member, a heater installed in said base member, and a shaker carrier rotatable about said base member and removably supported on said base member, said base member comprising a support within which said heating element is mounted with open lateral portions in the support communicating with the interior of said carrier when in place on the support.

2. An electrically heated container for condiment shakers comprising a base member, a heating element on said base member, a carrier for shakers removably mounted on said base member and having an internal compartment for removably receiving shakers accessible to said heater when the carrier is in place on the base member.

3. An electrically heated container for condiment shakers as claimed in claim 2 characterized by the fact that said carrier comprises a side circumscribing wall, a bottom wall carried by the side circumscribing wall and having an opening therethrough to fit over said heating element, and a top wall having openings therethrough for receiving the condiment shakers.

4. An electrically heated container for condiment shakers comprising a base member comprising a platform, a heater upstanding from the platform and a spindle upstanding from the heater, a rotary carrier for the condiment shakers comprising a side cylindrical wall having its lower portion adapted to overlap the outer peripheral edge of said platform, a bottom wall affixed to the outer cylindrical wall at a point spaced above the edge of said cylindrical wall, said bottom wall having an opening to fit down over said heating element, and a bearing block on said carrier having bearings to receive said spindle.

5. An electrically heated container for condiment shakers as claimed in claim 4 characterized by the fact that said bearing block has an upper bearing socket for receiving the upper tip end of said spindle and a lower ball bearing for receiving the lower portion of the spindle.

6. An electrically heated container for condiment shakers as claimed in claim 4 in which said bearing block has an upper bearing socket for receiving the upper tip portion of said spindle, a lower ball bearing carried by said bearing block for receiving the lower end portion of said spindle, said ball bearing having one race fixed to rotate with said bearing block and carrier, and another race supported upon said base member and adapted to remain substantially stationary with said base member.

7. An electrically heated container for condiment shakers as claimed in claim 6 further comprising a step on said base member in position to receive said other race member.

8. An electrically heated container for condiment shakers as claimed in claim 6 characterized by the fact that keys and key-ways are provided between the base member and said other race member for positively affixing said other race member against rotation.

ROBERT TOWNER HILL.

REFERENCES CITED

The following references are of record in the file of this patent:

UNITED STATES PATENTS

| Number | Name | Date |
|---|---|---|
| 49,840 | Young | Sept. 5, 1865 |
| 257,846 | Burgess et al. | May 16, 1882 |
| 277,384 | Turner | May 8, 1883 |
| 1,511,443 | Bonoff | Oct. 14, 1924 |
| 1,993,330 | Latiolais | Mar. 5, 1935 |
| 2,174,142 | Stickles et al. | Sept. 26, 1939 |
| 2,398,939 | Horn | Apr. 23, 1946 |
| 2,470,806 | Del Cueto | May 24, 1949 |